(12) United States Patent
Ohara (10) Patent No.: US 10,520,034 B2
(45) Date of Patent: Dec. 31, 2019

(54) MAGNETIC FLUID SEALED BEARING (71) Applicant: GLOBERIDE, Inc., Tokyo (JP)

(72) Inventor: Takeshige Ohara, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 15/778,850

(22) PCT Filed: Nov. 25, 2016

(86) PCT No.: PCT/JP2016/085833
§ 371 (c)(1),
(2) Date: May 24, 2018

(87) PCT Pub. No.: WO2017/090778
PCT Pub. Date: Jun. 1, 2017

(65) Prior Publication Data
US 2018/0355911 A1 Dec. 13, 2018

(30) Foreign Application Priority Data
Nov. 26, 2015 (JP) .................................. 2015-231002

(51) Int. Cl.
*F16C 33/76* (2006.01)
*F16J 15/43* (2006.01)
(Continued)

(52) U.S. Cl.
CPC ............ *F16C 33/765* (2013.01); *F16C 19/06* (2013.01); *F16C 33/7846* (2013.01); *F16J 15/43* (2013.01); *F16C 2300/40* (2013.01)

(58) Field of Classification Search
CPC .................................. F16C 33/765; F16J 15/43
(Continued)

(56) References Cited

U.S. PATENT DOCUMENTS

| 4,830,384 A | * | 5/1989 | Raj ........................... F16J 15/43 |
| | | | 277/410 |
| 4,984,908 A | | 1/1991 | Kronenberger et al. |

(Continued)

FOREIGN PATENT DOCUMENTS

| JP | 59-035773 U1 | 3/1984 |
| JP | 63-163029 A | 7/1988 |

(Continued)

OTHER PUBLICATIONS

International Search Report PCT/JP2016/085833 dated Mar. 7, 2017 w/English translation.
(Continued)

*Primary Examiner* — James Pilkington
(74) *Attorney, Agent, or Firm* — DLA Piper LLP (US)

(57) ABSTRACT

Provided is a magnetic fluid sealed bearing having a stable sealing performance in a gap. The magnetic fluid sealed bearing includes: an inner ring and an outer ring; a plurality of rolling elements disposed between the inner and outer rings; a ring-shaped polar plate mounted on an inner circumferential surface of the outer ring such that a gap is formed between the ring-shaped polar plate and an outer circumferential surface of the inner ring; a ring-shaped magnet attached to the ring-shaped polar plate and magnetized such that magnetic poles thereof point to axial directions, to form magnetic circuits on both an outer ring side and an inner ring side; an inner ring magnetic fluid retained in the magnetic circuit on the inner ring side; and a magnetic field intensity increasing portion for increasing magnetic field intensity of the magnetic circuit on the inner ring side.

12 Claims, 8 Drawing Sheets

(51) Int. Cl.
    *F16C 19/06*     (2006.01)
    *F16C 33/78*     (2006.01)

(58) Field of Classification Search
    USPC ......................................................... 277/410
    See application file for complete search history.

(56) References Cited

U.S. PATENT DOCUMENTS

| | | | | |
|---|---|---|---|---|
| 5,051,853 | A * | 9/1991 | Hosoya | F16J 15/43 |
| | | | | 277/347 |
| 5,161,902 | A * | 11/1992 | Fujii | F16C 33/765 |
| | | | | 277/410 |
| 5,267,737 | A * | 12/1993 | Cossette | F16J 15/43 |
| | | | | 277/410 |
| 6,029,978 | A * | 2/2000 | Pelstring | F16J 15/43 |
| | | | | 277/409 |
| 9,835,202 | B2 * | 12/2017 | Ohara | F16C 33/765 |
| 2013/0193647 | A1 * | 8/2013 | Honda | F16J 15/43 |
| | | | | 277/410 |
| 2015/0063733 | A1 | 3/2015 | Ohara | |
| 2016/0061263 | A1 | 3/2016 | Ohara | |
| 2017/0037905 | A1 | 2/2017 | Ohara | |

FOREIGN PATENT DOCUMENTS

| | | |
|---|---|---|
| JP | 63-246577 A | 10/1988 |
| JP | 63-177325 U1 | 11/1988 |
| JP | 2-29321 Y2 | 8/1990 |
| JP | 02-286967 A | 11/1990 |
| JP | 2013-228044 A | 11/2013 |
| JP | 2015-010673 A | 1/2015 |
| JP | 2015-010674 A | 1/2015 |
| SU | 1048217 A1 | 10/1983 |

OTHER PUBLICATIONS

Notification of Reasons for Refusal Japanese Patent Application No. 2015-231002 dated Oct. 11, 2018 with English translation.
Decision for Refusal dated May 7, 2019 issued in corresponding Japanese Patent Application No. 2015-231002 with English translation.
Extended European Search Report EP Application No. 16868721.8 dated Feb. 27, 2019.
The First Office Action dated Mar. 4, 2019, of counterpart Chinese Application No. 201690067336.7, along with an English translation.
The Second Office Action dated Sep. 20, 2019, of counterpart Chinese Application No. 201680067336.7, along with an English translation.

* cited by examiner

MAGNETIC FLUID SEALED BEARING

CROSS-REFERENCE TO RELATED APPLICATIONS

This is the U.S. National Stage of PCT/JP2016/085833, filed Nov. 25, 2016, which in turn claims priority to Japanese Patent Application No. 2015-231002, filed Nov. 26, 2015, the contents of each of these applications being incorporated herein by reference in their entireties.

TECHNICAL FIELD

The present disclosure relates to a magnetic fluid sealed bearing that is disposed on various power transmission mechanisms in such a manner as to support a rotation shaft rotatably and prevent foreign substances such as dust and water from entering inside.

BACKGROUND

Conventional rotation shafts provided in various drive force transmission mechanisms are rotatably supported via bearings. For such rotation shafts, so-called ball bearings are used in order to improve rotation performance of the rotation shafts. The ball bearings contain multiple rolling elements (rolling members) circumferentially arranged between inner and outer rings.

Such bearings are used as support members for rotation shafts of drive force transmission mechanisms in various drive units, and some drive units are desired to prevent foreign substances such as dust and water from entering inside through the bearings. Moreover, when foreign substances enter the bearings, rotation performance of the rotation shafts could be deteriorated and noise could be caused. For this reason, Patent Literature 1 for example discloses a magnetic fluid sealed bearing having a sealing ability using a magnetic fluid.

In the magnetic fluid sealed bearing disclosed in Patent Literature 1, a ring-shaped polar plate having a ring-shaped (annular) magnet attached thereto is mounted on (fitted in) one of an inner ring and an outer ring, a gap is formed on the other of the inner ring and the outer ring, and a magnetic fluid is retained in the gap portion, so as to prevent foreign substances from entering inside. In the magnetic fluid sealed bearing disclosed in Patent Literature 1, the ring-shaped magnet is magnetized in the axial direction, and the ring-shaped polar plate is attached to the opening side of the ring-shaped magnet. In this arrangement, a magnetic circuit is formed on each of the inner ring side and the outer ring side. Therefore, the magnetic fluid is also retained in a minute gap formed on the side where the ring-shaped polar plate (the ring-shaped magnet) is mounted (a gap formed on the mounting side will be hereinafter referred to as "the minute gap"), so as to prevent the foreign substances from entering inside from the outer ring side and the inner ring side.

RELEVANT REFERENCES

Patent Literature

Patent Literature 1: Japanese Patent Application Publication No. 2013-228044

SUMMARY

Problems to be Solved by the Invention

Figure 1A:
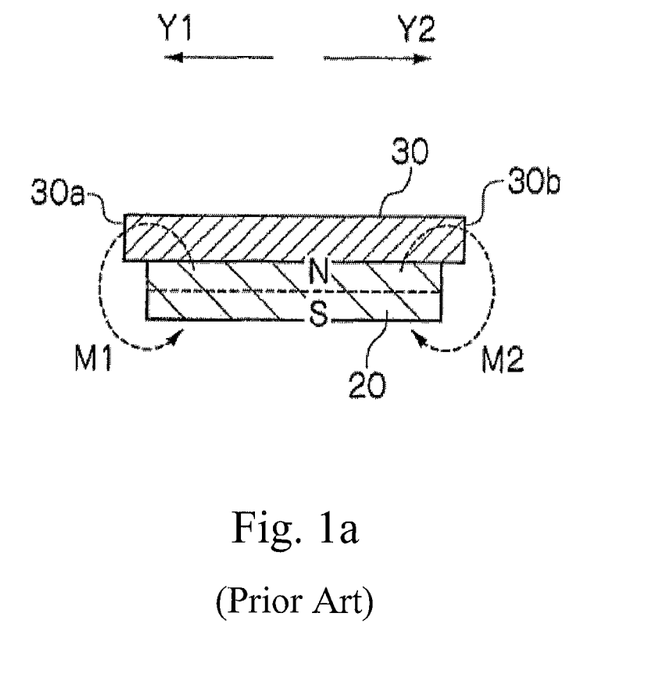
FIG. 1a is a schematic view of a magnetic circuit formed by a ring-shaped polar plate having a ring-shaped magnet magnetized in the axial direction and attached to the ring-shaped polar plate, this view showing a conventional arrangement.

As described above, when a ring-shaped magnet is magnetized in the axial direction and is attached to a ring-shaped polar plate, magnetic circuits having the same magnetic field intensity are formed on the radially opposite sides (see the schematic view of FIG. 1a). That is, as disclosed in Patent Literature 1, when the thicknesses of the ring-shaped polar plate 30 and the ring-shaped magnet 20 are the same, the magnetic circuits M1, M2 formed on the radially opposite sides between the inner ring and the outer ring (the inner ring is on the side indicated by Y1, and the outer ring is on the side indicated by Y2) have substantially the same magnetic field intensity, taking account of only the polar plate 30 in the absence of the inner ring and the outer ring.

However, since a gap is formed between the inner ring (or the outer ring) and the polar plate and the magnetic fluid is retained in the gap, the magnetic circuit formed on the gap side has a lower magnetic field intensity than the magnetic circuit formed on the mounting side (fitting side). Referring to FIG. 1a, when the gap is formed on the inner ring side, such a portion includes a nonmagnetic material and thus has a low magnetic permeability, and the magnetic force (the magnetic field intensity) directed from an end surface 30a of the polar plate 30 toward the inner ring made of a magnetic material is smaller than the magnetic force (the magnetic field intensity) directed from an end surface 30b of the polar plate 30 toward the outer ring made of a magnetic material. As a result, the retention force of the magnetic fluid retained in the gap is weak, failing to achieve a sufficient and stable sealing performance.

To produce a sufficient sealing force in the gap portion, it is necessary to dispose a magnet that produces a high magnetic field intensity, and thus the magnetic fluid sealed bearing cannot be downsized efficiently.

The present invention addresses the above problems, and one object thereof is to provide a magnetic fluid sealed bearing having a stable sealing performance in the gap portion.

Means for Solving the Problem

To achieve the above object, a magnetic fluid sealed bearing according to the present invention comprises: an inner ring and an outer ring, both formed of a magnetic material; a plurality of rolling elements disposed between the inner ring and the outer ring; a ring-shaped polar plate formed of a magnetic material, the ring-shaped polar plate being mounted on an inner circumferential surface of the outer ring such that a gap is formed between the ring-shaped polar plate and an outer circumferential surface of the inner ring; a ring-shaped magnet attached to an axially inner surface of the ring-shaped polar plate, the ring-shaped magnet being magnetized such that magnetic poles thereof point to axial directions, to form magnetic circuits on both an outer ring side and an inner ring side; an inner ring magnetic fluid for sealing the gap, the inner ring magnetic fluid being retained in the magnetic circuit formed on the inner ring side; and a magnetic field intensity increasing portion for increasing magnetic field intensity of the magnetic circuit formed on the inner ring side to a level higher than that of the magnetic circuit formed on the outer ring side.

In the above arrangement, the ring-shaped magnet magnetized in the axial directions is attached to the ring-shaped polar plate, and therefore, the magnetic circuits are formed symmetrically on the inner ring side and the outer ring side. The magnetic force of the magnetic circuit formed on the inner ring side is smaller than that of the magnetic circuit formed on the outer ring side because of the presence of the gap formed between the ring-shaped polar plate and the outer circumferential surface of the inner ring. However, the magnetic field intensity increasing portion increases the magnetic force of the magnetic circuit formed on the inner ring side to a level higher than that of the magnetic circuit formed on the outer ring side, and therefore, the retention force for retaining the magnetic fluid in the gap is increased to achieve stable sealing characteristics.

Figure 1B:
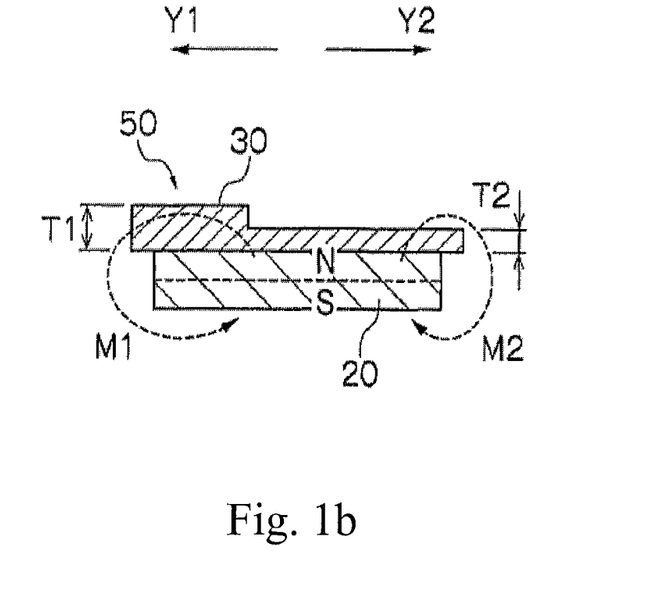
FIG. 1b is a schematic view of a magnetic circuit formed by a ring-shaped polar plate having a ring-shaped magnet magnetized in the axial direction and attached to the ring-shaped polar plate, this view showing an arrangement including a magnetic field intensity increasing portion.

The magnetic field intensity increasing portion is configured such that, as the ring-shaped magnet is attached to the ring-shaped polar plate, the magnetic force of the magnetic circuit formed on the inner ring side is higher than that of the magnetic circuit formed on the outer ring side. As shown in FIG. 1b for example, the magnetic field intensity increasing portion can be constituted by the ring-shaped polar plate 30 formed such that the inner ring side Y1 is thicker than the outer ring side Y2 (T1>T2). With this arrangement, the magnetic field intensity of the magnetic circuit M1 on the inner ring side can be higher than that of the magnetic circuit M2 on the outer ring side. That is, the magnetic field intensity generated by the magnet 20 depends on the surface area of the polar plate 30. As the surface area on the gap side is larger, the magnetic field intensity in the gap portion can be effectively increased to produce sufficient magnetic force even though the magnetic permeability is reduced because of the presence of the gap. Accordingly, since the ring-shaped polar plate and the ring-shaped magnet having the magnetic field intensity increasing portion is disposed between the inner ring and the outer ring, the magnetic field intensity on the gap side can be efficiently increased as compared to the conventional arrangement (shown in FIG. 1a), so as to achieve stable sealing characteristics.

The magnetic field intensity increasing portion can be constituted by, for example, the ring-shaped polar plate including a tapered surface that is tapered down from the inner ring side toward the outer ring side or by a nonmagnetic spacer interposed between the ring-shaped polar plate and the inner circumferential surface of the outer ring. Further, in an arrangement in which a minute gap is formed between the inner circumferential surface of the outer ring, and the ring-shaped polar plate and the ring-shaped magnet, a magnetic fluid (an outer ring magnetic fluid) should preferably be retained in the minute gap, so as to securely seal the interior.

Opposite to the above arrangement, the ring-shaped polar plate having the above ring-shaped magnet attached thereto may be mounted on the outer circumferential surface of the inner ring so as to form a gap on the outer ring side in which an outer ring magnetic fluid is retained to seal the interior.

Advantages

The present invention provides a magnetic fluid sealed bearing having a stable sealing performance in the gap portion.

DESCRIPTION OF EXAMPLE EMBODIMENTS

Figure 2:
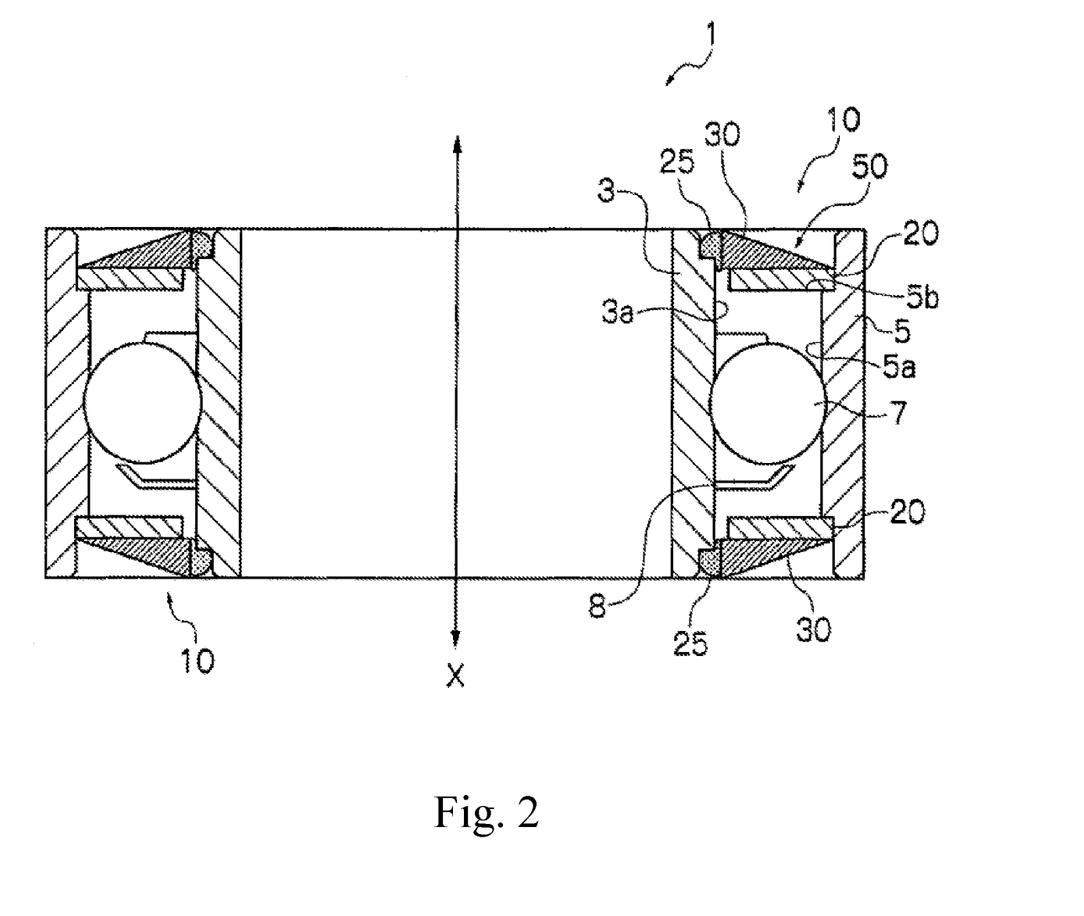
FIG. 2 is a sectional view of a first embodiment of a magnetic fluid sealed bearing according to the present invention viewed along the axial direction thereof.
Figure 3:
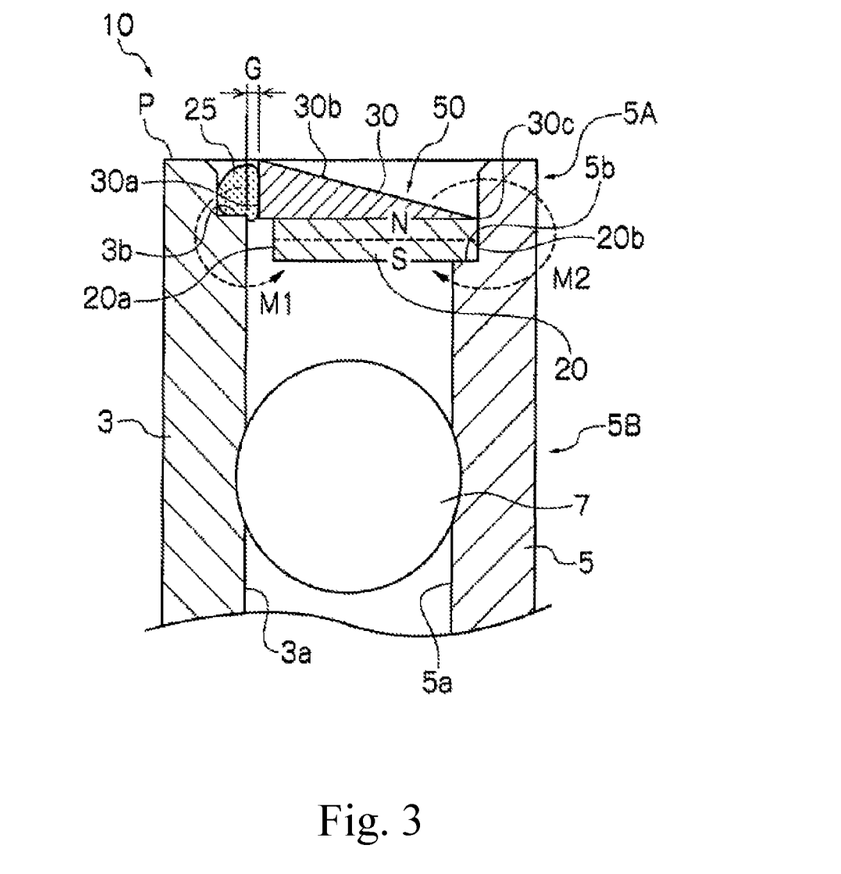
FIG. 3 is an enlarged view of a main part in FIG. 2.

Embodiments of a magnetic fluid sealed bearing according to the disclosure will be hereinafter described with reference to the drawings. FIGS. 2 and 3 illustrate a first embodiment of a magnetic fluid sealed bearing according to the disclosure; FIG. 2 is a sectional view along the axial direction and FIG. 3 is an enlarged view of the main part in FIG. 2.

A magnetic fluid sealed bearing 1 (hereunder also referred to as "the bearing") according to the embodiment includes a cylindrical inner ring 3, a cylindrical outer ring 5 encircling the inner ring 3, and a plurality of rolling elements (rolling members) 7 placed between the inner ring 3 and the outer ring 5. The rolling elements 7 are retained by a retainer 8 extending in the circumferential direction and allow the inner ring 3 and the outer ring 5 to rotate relative to each other.

The inner ring 3, the outer ring 5, and the rolling elements 7 are formed of a magnetic material such as chrome-based stainless steel (SUS440C), and the retainer 8 is formed of a material that resists corrosion and heat such as a stainless steel material (SUS304). The rolling elements 7 may not be made of a magnetic material. The inner ring 3 and the outer ring 5 of this embodiment have the same (or generally the same) length in the axial direction X (the direction of the axis of the bearing); alternatively, the outer ring 5 may be longer in the axial direction than the inner ring 3, or the inner ring 3 may be longer in the axial direction than the outer ring 5.

In the opening between the inner ring 3 and the outer ring 5, there is provided a magnetic sealing mechanism (a magnetic fluid seal) 10. In this embodiment, the same magnetic sealing mechanisms 10 are provided in the openings on both sides of the inner ring 3 and the outer ring 5. Therefore, the upper right portion in FIG. 2 (the main part) will be hereunder described.

The magnetic sealing mechanism 10 includes a ring-shaped magnet (hereinafter also referred to as "the magnet") 20, a ring-shaped polar plate (hereinafter also referred to as "the polar plate") 30 having the magnet 20 attached to the axially inner surface thereof, and a magnetic fluid (an inner ring magnetic fluid 25 in this embodiment) retained in a magnetic circuit formed by the magnet 20. These members constitute a sealing ability for shutting out dust, moisture, etc. from the rolling elements 7.

The magnet 20 may be a permanent magnet having a high magnetic flux density and a high magnetism, such as a neodymium magnet prepared by sintering. The magnet 20 is previously magnetized such that the magnetic poles (the S-pole, the N-pole) point to the axial direction X (the direction of the axis of the bearing). Furthermore, on an axially outer side surface of the magnet 20, there is disposed the polar plate 30 so as to be in contact with the magnet 20. The polar plate 30 has substantially the same ring-like outer shape as the magnet 20 and is formed of a magnetic material such as chrome-based stainless steel (SUS440C). Accordingly, as shown in FIGS. 1a and 1b, magnetic circuits M1, M2 are formed on the inner ring side and the outer ring side, respectively The magnetic fluid retained by the magnetic circuits is prepared by, for example, dispersing magnetic fine particles of $Fe_3O_4$ in base oil using a surfactant and thus has viscosity and reacts with a magnet brought close thereto. That is, the magnetic fluid is retained in the gap G to seal the gap, so as to prevent foreign substances such as dust and moisture from entering inside.

In the embodiment, a step 5b is formed in the inner circumferential surface 5a of the outer ring 5 facing the rolling elements. Because of the presence of the step 5b, the outer ring 5 includes thin regions 5A in both opening sides and a thick region 5B in the rolling element side. Thus, the distance between the inner ring and the outer ring is larger in the axially outer sides than in the axially inner side. The step 5b serves to position and fix the magnet 20 (the magnet 20 to which the polar plate 30 is attached; the polar plate formed into a unit together with the magnet) as the magnet 20 is inserted (fitted) from the opening side so as to be set at a predetermined position where it abuts against the step 5a. Therefore, the step 5b should preferably have a surface orthogonal to the axial direction. Instead of having the orthogonal surface as in the embodiment, the step 5b may include a staircase or may be sloped, as long as it can retain the magnet 20 stably.

The polar plate 30 is attached to the magnet 20 so that a gap is formed between the polar plate 30 and the outer peripheral surface 3a of the inner ring 3. The polar plate 30 has such a size as to protrude toward a radially inner side with respect to an inner ring-side edge surface 20a of the magnet 20, and the magnet 20, which is attached to the polar plate 30, forms a gap between itself and the outer peripheral surface 3a of the inner ring 3, the gap having substantially the same size as the above-described gap G (in the drawing, the gap is slightly larger than the gap G). When the magnetic fluid (the inner ring magnetic fluid 25) is filled into the gap G by using an injection tool such as a syringe, the magnetic fluid is retained by a magnetic force of the magnetic circuits. The magnet 20 and the polar plate 30 may be fixed together by magnetic attraction or via an adhesive in combination with magnetic attraction.

A step 3b should preferably be formed in the outer circumferential surface of the inner ring 3 at a portion facing the inner ring-side edge surface 30a of the polar plate 30 such that the step 3b extends in the direction orthogonal to the outer circumferential surface. Because of the presence of the step 3b, the inner ring magnetic fluid 25 is retained so as to extend in the radial direction, increasing the sealing ability. The polar plate 30 should preferably be fixed so as not to project in the axial direction beyond the exposed end surface level P of the inner ring 3 and the outer ring 5. Since the polar plate 14 does not project in the axial direction (or preferably it is recessed from the exposed end surface level P), the magnetic fluid 25 is less prone to contact with external objects and is safe from dispersion.

The magnetic sealing mechanism 10 includes a magnetic field intensity increasing portion 50 that increases the magnetic field intensity of the magnetic circuit M1 formed on the inner ring side to a level higher than that of the magnetic circuit M2 formed on the outer ring side. The magnetic field intensity increasing portion 50 controls the amounts of magnetic flux passing on the inner ring side and the outer ring side through the polar plate 30 on both sides between the inner ring and the outer ring in the radial direction such that the amount of magnetic flux passing on the inner ring side is larger. Because of the presence of the magnetic field intensity increasing portion 50, when the polar plate 30 having the magnet 20 attached thereto is placed in position, the magnetic force on the gap side is larger than in the arrangement without the magnetic field intensity increasing portion 50, making it possible to retain the inner ring magnetic fluid 25 stably.

In the embodiment, the polar plate 30 forms the magnetic field intensity increasing portion 50 by thickening the inner ring side and thinning the outer ring side of the polar plate 30. That is, since the amount of magnetic flux depends on the surface area, the amount of magnetic flux is larger when the thickness of the polar plate 30 facing the outer circumferential surface of the inner ring is larger than the thickness of the polar plate 30 facing the inner circumferential surface of the outer ring, resulting in the larger magnetic field intensity of the magnetic circuit formed on the inner ring side.

More specifically, in the embodiment, the polar plate 30 includes a tapered surface 30b that is tapered down from the inner ring side toward the outer ring side, and an edge portion 30n outer ring side having a small thickness is aligned with an outer ring-side edge surface 20b of the magnet 20. With this arrangement, the magnetic flux generated by the magnet 20 is biased toward the inner ring side, making it possible to retain the inner ring magnetic fluid 25 stably without reducing the magnetic force in the gap portion. Further, since the edge portion 30c of the polar plate 30 on the outer ring side is aligned with the outer ring-side edge surface 20b of the magnet 20, positioning of these members is facilitated.

In the above arrangement, the inner ring magnetic fluid 25 is retained in the gap G on the inner ring side. Since there is possibility that a minute gap is formed between the inner circumferential surface 5a of the outer ring 5 and the magnet 20 due to dimension tolerance of the magnet 20, an outer ring magnetic fluid (not shown) can be filled in the minute gap to increase the sealing ability.

Next, another embodiment of the disclosure will be described. In the embodiment described below, components configured similarly to those in the foregoing embodiment are denoted by the same reference characters, and detailed descriptions thereof are omitted.

Figure 4:
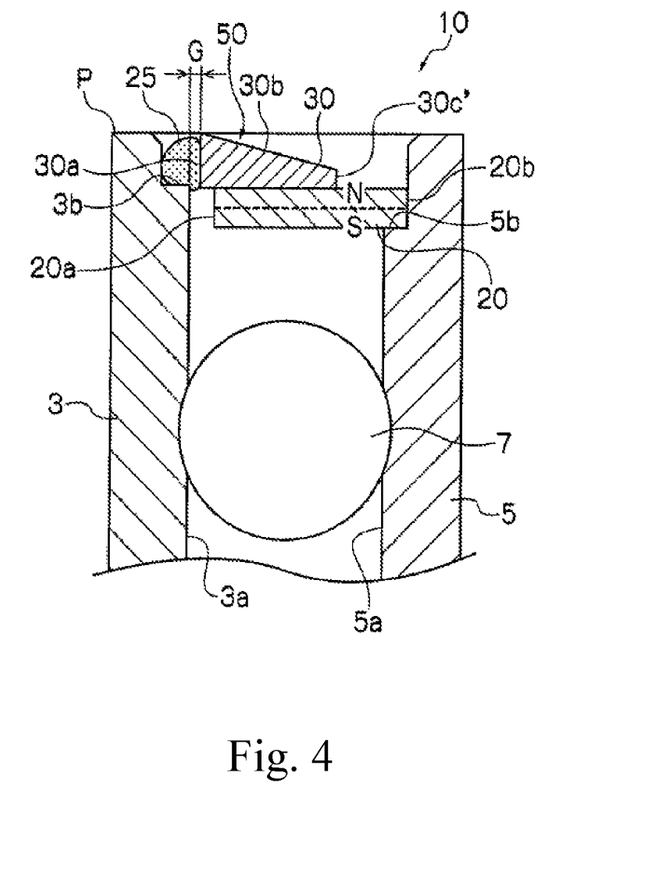
FIG. 4 is an enlarged view of a main part of a second embodiment of the present invention.

FIG. 4 is an enlarged view of a main part of a second embodiment of the present invention. In the magnetic field intensity increasing portion 50 of this embodiment, the polar plate 30 includes a tapered surface 30b that is tapered down from the inner ring side toward the outer ring side, and the tapered surface is terminated at the middle portion of the polar plate 30 such that the polar plate 30 has a substantially trapezoid section. Therefore, a gap is formed between an edge portion 30c' of the polar plate 30 on the outer ring side having a small thickness and the inner circumferential surface 5a of the outer ring 5, and this gap portion serves as a nonmagnetic spacer.

With this arrangement, the magnetic force of the magnetic circuit formed on the inner ring side can be increased more than in the first embodiment, making it possible to retain the inner ring magnetic fluid 25 more stably in the gap G.

Figure 5:
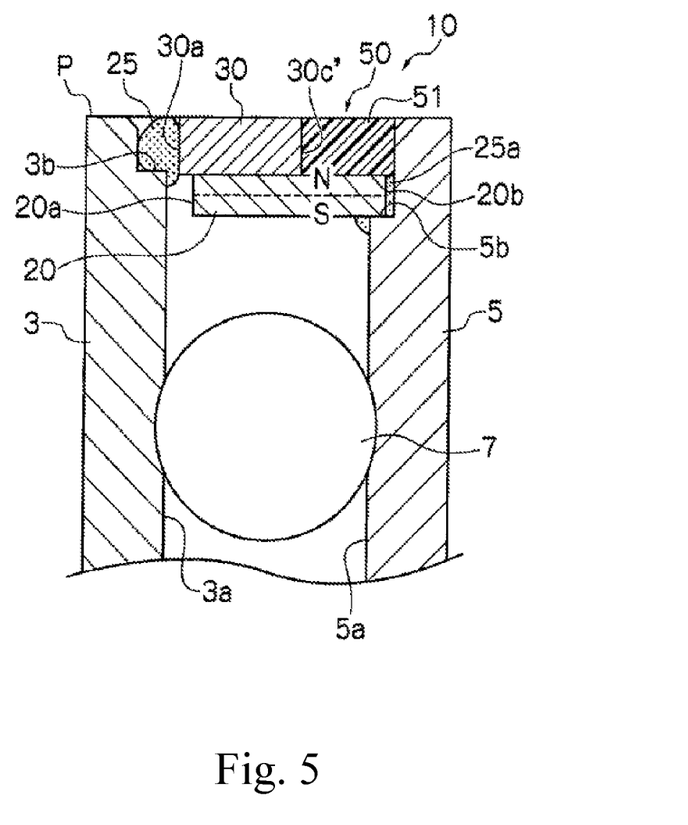
FIG. 5 is an enlarged view of a main part of a third embodiment of the present invention.

FIG. 5 is an enlarged view of a main part of a third embodiment of the present invention. In the magnetic field intensity increasing portion 50 of this embodiment, the polar plate 30 has a uniform thickness, and a ring-shaped spacer 51 formed of a nonmagnetic material such as a resin is disposed on the outer ring side of the polar plate 30. Since such a nonmagnetic spacer 51 is interposed between the edge portion 30c' of the polar plate 30 on the outer ring side and the inner circumferential surface Sa of the outer ring 5, the magnetic force of the magnetic circuit formed on the inner ring side can be increased, making it possible to retain the inner ring magnetic fluid 25 stably in the gap G, as in the above embodiments.

Further, when the spacer 51 is formed of a resin material, the spacer 51 can be readily integrated with the polar plate 30 and the magnet 20 into a unit, which can be readily installed and positioned between the inner ring and the outer ring. The spacer 51, which is formed of a nonmagnetic material, may be formed of a nonmagnetic metal or a simple air layer. The spacer 51 should preferably have a radial length larger than the length of the gap G. This makes it possible to increase the magnetic field intensity on the inner ring side more effectively and retain the magnetic fluid stably.

Furthermore, in this embodiment, the outer ring magnetic fluid 25a is filled in the minute gap between the inner circumferential surface Sa of the outer ring 5 and the magnet 20. This increases the ability of sealing the interior. The outer ring magnetic fluid 25a can be disposed by filling the same magnetic fluid on the outer ring side as that used for filling the inner ring magnetic fluid.

Figure 6:
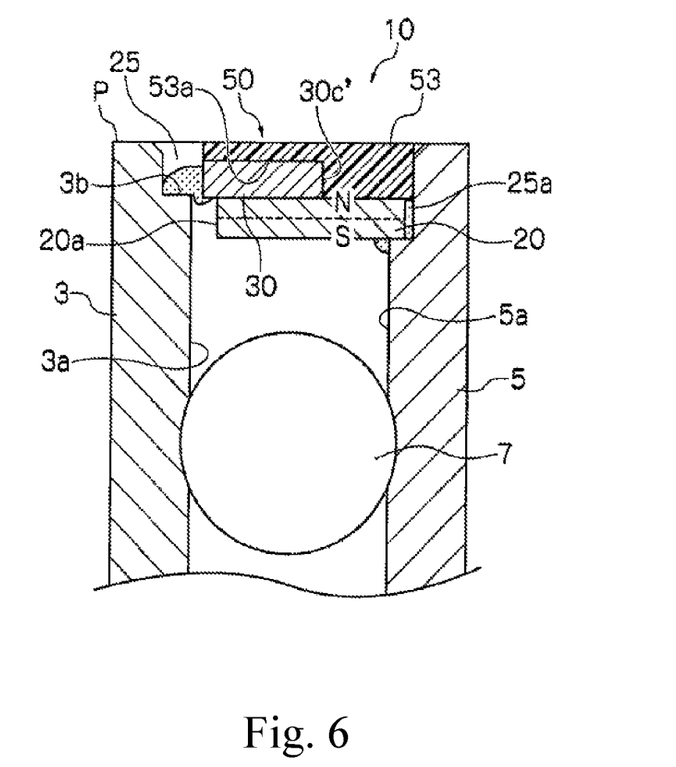
FIG. 6 is an enlarged view of a main part of a fourth embodiment of the present invention.

FIG. 6 is an enlarged view of a main part of a fourth embodiment of the present invention. As in the third embodiment, the magnetic field intensity increasing portion 50 of this embodiment includes a spacer 53 formed of a resin and interposed between the polar plate and the outer ring. The spacer 53 has a ring-shaped recess 53a formed in the inner ring side thereof, and the ring-shaped polar plate 30 is attached to this recess. That is, the surface of the spacer 53 formed of a resin is exposed to the opening between the inner ring and the outer ring, and the spacer 53 retains the ring-shaped polar plate 30 on the axially inner side thereof such that the surface of the polar plate 30 is not exposed.

With this arrangement, the polar plate 30 and the magnet 20 along with the spacer 53 can be accurately integrated into a unit, which can be readily installed. Further, in this arrangement, the surface of the spacer 53 formed of a resin is exposed in the opening, making it possible to protect the surface of the polar plate and improve the outer appearance by coloring or the like.

In the foregoing embodiments, the magnetic sealing mechanism 10 of the bearing 1 includes the gap G formed on the inner ring side with the inner ring magnetic fluid retained in the gap G. The gap G may be formed on the outer ring side in any of the foregoing embodiments.

Figure 7:
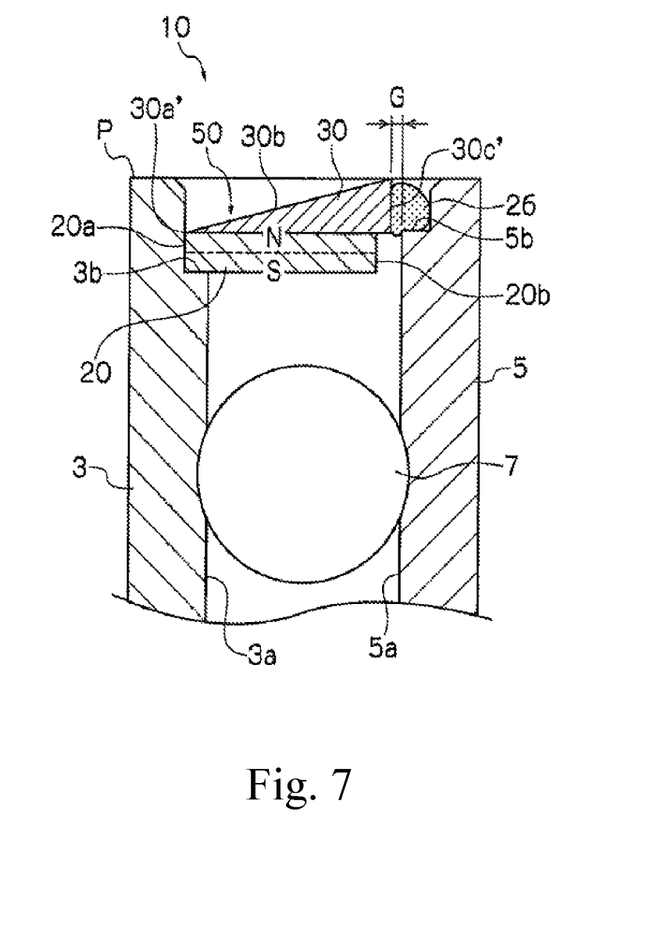
FIG. 7 is an enlarged view of a main part of a fifth embodiment of the present invention.

FIG. 7 is an enlarged view of a main part of a fifth embodiment of the present invention. This embodiment has the same arrangement as the first embodiment in which a magnetic fluid (an outer ring magnetic fluid) 26 is retained between the outer ring-side edge portion 30c' of the polar plate 30 and the inner circumferential surface 5a of the outer ring 5. Contrary to the first embodiment, the polar plate 30 includes a tapered surface 30b that is tapered down from the outer ring side toward the inner ring side, and an edge portion 30a' on the inner ring side having a small thickness is aligned with an inner ring-side edge surface 20a of the magnet 20. In this arrangement, the magnetic flux generated by the magnet 20 is biased toward the outer ring side, making it possible to retain the outer ring magnetic fluid 26 stably without reducing the magnetic force in the gap portion. Further, since the edge portion 30a' of the polar plate 30 on the inner ring side is aligned with the inner ring-side edge surface 20a of the magnet 20, positioning of these members is facilitated.

When the gap is formed on the outer ring side in the same magnetic sealing mechanism as in the second to fourth embodiments, the inner ring magnetic fluid may be retained in the minute gap formed on the inner ring side.

Figure 8:
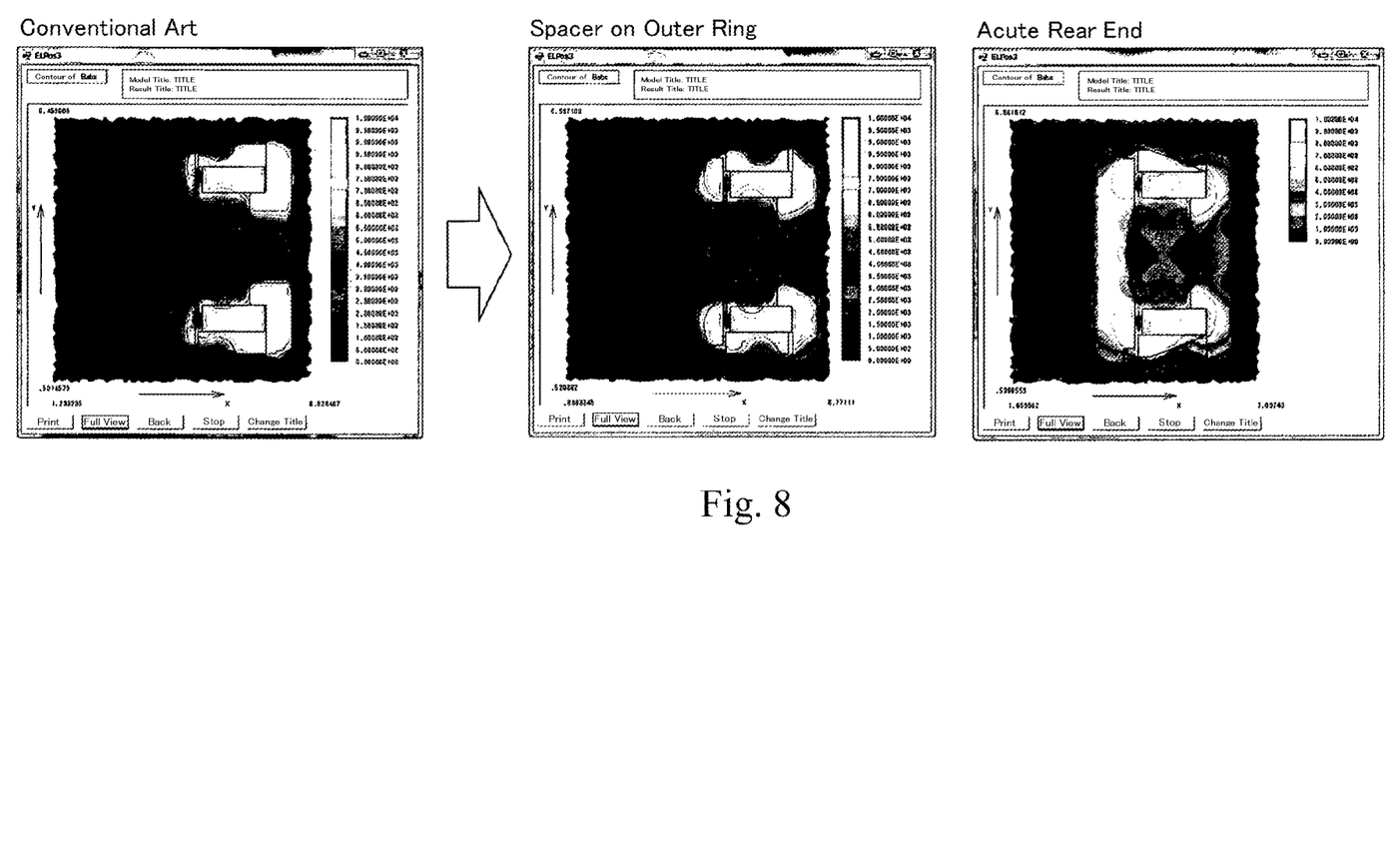
FIG. 8 shows magnetic field intensity distribution of a conventional magnetic circuit and the magnetic circuits of the present invention.

FIG. 8 shows magnetic field intensity distribution of the conventional magnetic circuit and the magnetic circuits of the present invention. The bearings compared include one having an ordinarily shaped polar plate as in FIG. 1a, one having a nonmagnetic spacer (an air layer) disposed on the outer ring side of the polar plate as in FIG. 5, and one having a polar plate with a tapered surface as in FIG. 3. These bearings were prepared under the same conditions of the sizes of the inner ring and the outer ring, the size of the magnet in the magnetic sealing mechanism, the basic thickness of the polar plate, and the size of the gap G. FIG. 8 shows the magnetic field intensity distribution of the above three types of bearings simulated on a personal computer using a commonly available magnetic field analysis software.

The magnetic field intensity distribution shows that, in the magnetic sealing mechanism of the ordinary type shown in FIG. 1a, the intensity of the magnetic field generated on the gap side is low, and therefore, the magnetic fluid is retained with a small retention force, as described in the section "PROBLEM TO BE SOLVED BY THE INVENTION." By contrast, in the bearing including a nonmagnetic spacer disposed on the outer ring side of the polar plate and the bearing having the polar plate tapered down toward the outer ring side, the intensity of the magnetic field generated on the gap side is high and the magnetic fluid is retained stably.

In the simulation for the bearing having a nonmagnetic spacer interposed between the polar plate and the inner circumferential surface of the outer ring, the radial length of the spacer was slightly larger than the length of the gap. The magnetic field intensity on the gap side can be made higher by further enlarging the radial length of the spacer.

While the foregoing has described the embodiments of the present invention, the present invention is not limited to the above-described embodiments and can be modified as appropriate.

The magnetic field intensity increasing portion described above addresses the problem that when the ring-shaped magnet and the ring-shaped polar plate disposed thereon, which constitute an ordinary arrangement as shown in FIG. 1a, are installed between the inner ring and the outer ring, the magnetic field intensity on the gap side is reduced. This ordinary arrangement can be modified as necessary in aspects other than the shape of the polar plate and the positional arrangement as long as the magnetic field intensity of the magnetic circuit formed on the gap side is increased, as shown in FIG. 1b for example. For example, the magnet may be biased toward the gap, or the polar plate may be formed of such a material that increases the magnetic permeability and the saturation magnetic flux density on the gap side.

In the magnetic sealing mechanism of the above embodiments, the magnet 20 abuts against the step 5b formed on the outer ring side or the step 3b formed on the inner ring side so as to be positioned and fixed. Alternatively, it may also be possible that the magnet 20 is fitted (press-fitted) and fixed without using the steps, or the polar plate having the magnet attached thereto abuts against a step or the like so as to be positioned and fixed. In this case, the polar plate may be additionally provided with a projection or a recess to abut against the step.

In the above embodiments, the surfaces of the inner ring 3 and the outer ring 5 should preferably be subjected to electrolytic chromate treatment. The electrolytic chromate treatment prevents cracking in the surface caused by rust or corrosion and thus securely prevents dust and foreign substances from entering inside.

Further, in the above embodiments, when the polar plate 30 is exposed to the opening side, a ring-shaped shield (sealing cover) may be press-fitted and fixed from an axially outer direction onto the axially outer surface of the polar plate 30. Such a shield can be formed of a corrosion-resistant and heat-resistant material such as stainless steel (SUS304) or a resin, and this shield effectively prevents penetration of foreign substances and adhesion of magnetic matters (foreign substances) such as iron sand onto the magnet 20.

LIST OF REFERENCE NUMBERS 1 magnetic fluid sealed bearing
3 inner ring
5 outer ring
7 rolling elements
10 magnetic sealing mechanism
20 ring-shaped magnet
25 inner ring magnetic fluid
26 outer ring magnetic fluid
30 ring-shaped polar plate
50 magnetic field intensity increasing portion
G gap

What is claimed is:

1. A magnetic fluid sealed bearing, comprising:
an inner ring and an outer ring, both formed of a magnetic material;
a plurality of rolling elements disposed between the inner ring and the outer ring;
a ring-shaped polar plate formed of a magnetic material, the ring-shaped polar plate being mounted on an inner circumferential surface of the outer ring such that a gap is formed between the ring-shaped polar plate and an outer circumferential surface of the inner ring;
a ring-shaped magnet attached to an axially inner surface of the ring-shaped polar plate, the ring-shaped magnet being magnetized such that magnetic poles thereof face in an axial direction, to form magnetic circuits on both an outer ring side and an inner ring side;
an inner ring magnetic fluid for sealing the gap, the inner ring magnetic fluid being retained in the magnetic circuit formed on the inner ring side, and
a magnetic field intensity increasing portion for increasing magnetic field intensity of the magnetic circuit formed on the inner ring side to a level higher than that of the magnetic circuit formed on the outer ring side;
wherein the ring-shaped polar plate includes a thicker portion and a thinner portion, the thicker portion configured to be thicker than the thinner portion in the axial direction, the thicker portion being disposed inside of the thinner portion in a radial direction; and
wherein at least a part of the thicker portion is disposed on an axially outer side of the ring-shaped magnet; and
wherein the magnetic field intensity increasing portion includes the ring-shaped polar plate that is thicker in the inner ring side and is thinner in the outer ring side.

2. The magnetic fluid sealed bearing of claim 1, wherein the ring-shaped polar plate includes a tapered surface that is tapered down from the inner ring side toward the outer ring side, the tapered surface being disposed on an axially outer side of the ring-shaped magnet.

3. The magnetic fluid sealed bearing of claim 1, wherein the magnetic field intensity increasing portion includes a nonmagnetic spacer interposed between the ring-shaped polar plate and the inner circumferential surface of the outer ring.

4. The magnetic fluid sealed bearing of claim 3, wherein the nonmagnetic spacer is formed of a resin material and retains the ring-shaped polar plate with a surface of the nonmagnetic spacer exposed to an opening between the inner ring and the outer ring.

5. The magnetic fluid sealed bearing of claim 1, wherein an outer ring magnetic fluid is retained in a gap formed between the inner circumferential surface of the outer ring, the ring-shaped polar plate and the ring-shaped magnet.

6. The magnetic fluid sealed bearing of claim 1, wherein a step is formed in the inner circumferential surface of the outer ring; and wherein the magnet is fixed onto the step.

7. A magnetic fluid sealed bearing, comprising:
an inner ring and an outer ring, both formed of a magnetic material;
a plurality of rolling elements disposed between the inner ring and the outer ring;
a ring-shaped polar plate formed of a magnetic material, the ring-shaped polar plate being mounted on an outer circumferential surface of the inner ring such that a gap is formed between the ring-shaped polar plate and an inner circumferential surface of the outer ring;
a ring-shaped magnet attached to an axially inner surface of the ring-shaped polar plate, the ring-shaped magnet being magnetized such that magnetic poles thereof face in an axial direction, to form magnetic circuits on both an outer ring side and an inner ring side;
an outer ring magnetic fluid for sealing the gap, the outer ring magnetic fluid being retained in the magnetic circuit on the outer ring side, and
a magnetic field intensity increasing portion for increasing magnetic field intensity of the magnetic circuit formed on the outer ring side to a level higher than that of the magnetic circuit formed on the inner ring side;
wherein the ring-shaped polar plate includes a thicker portion and a thinner portion, the thicker portion configured to be thicker than the thinner portion in the axial direction, the thicker portion being disposed outside of the thinner portion in a radial direction; and
wherein at least a part of the thicker portion is disposed on an axially outer side of the ring-shaped magnet; and
wherein the magnetic field intensity increasing portion includes the ring-shaped polar plate that is thicker in the outer ring side and is thinner in the inner ring side.

8. The magnetic fluid sealed bearing of claim 7, wherein the ring-shaped polar plate includes a tapered surface that is tapered down from the outer ring side toward the inner ring side, the tapered surface being disposed on an axially outer side of the ring-shaped magnet.

9. The magnetic fluid sealed bearing of claim 7, wherein the magnetic field intensity increasing portion includes a nonmagnetic spacer interposed between the ring-shaped polar plate and the outer circumferential surface of the inner ring.

10. The magnetic fluid sealed bearing of claim 9, wherein the nonmagnetic spacer is formed of a resin material and retains the ring-shaped polar plate with a surface of the nonmagnetic spacer exposed to an opening between the inner ring and the outer ring.

11. The magnetic fluid sealed bearing of claim 7, wherein an inner ring magnetic fluid is retained in a gap formed between the outer circumferential surface of the inner ring, the ring-shaped polar plate and the ring-shaped magnet.

12. The magnetic fluid sealed bearing of claim 7, wherein a step is formed in the outer circumferential surface of the inner ring; and wherein the magnet is fixed onto the step.

\* \* \* \* \*